(12) United States Patent
Pulkrabek (10) Patent No.: US 12,419,289 B2
(45) Date of Patent: Sep. 23, 2025

(54) FISHING ROD WITH VIBRATION AMPLIFICATION CHAMBER

(71) Applicant: TrikaUSA Inc., Superior, WI (US)

(72) Inventor: Larry Pulkrabek, Superior, WI (US)

(73) Assignee: TrikaUSA Inc., Superior, WI (US)

( * ) Notice: Subject to any disclaimer, the term of this patent is extended or adjusted under 35 U.S.C. 154(b) by 0 days.

(21) Appl. No.: 18/679,081

(22) Filed: May 30, 2024

(65) Prior Publication Data

US 2024/0397923 A1    Dec. 5, 2024

Related U.S. Application Data

(60) Provisional application No. 63/505,363, filed on May 31, 2023.

(51) Int. Cl.
  *A01K 87/08*  (2006.01)
  *A01K 87/06*  (2006.01)

(52) U.S. Cl.
  CPC .............. *A01K 87/08* (2013.01); *A01K 87/06* (2013.01)

(58) Field of Classification Search
  CPC ......... A01K 87/00; A01K 87/06; A01K 87/08
  See application file for complete search history.

(56) References Cited

U.S. PATENT DOCUMENTS

| 2015/0344646 | A1* | 12/2015 | Hansen | A01K 87/00 |
| | | | | 428/35.8 |
| 2017/0013816 | A1* | 1/2017 | Huang | A01K 87/08 |

FOREIGN PATENT DOCUMENTS

KR    20240149307 A  * 10/2024

* cited by examiner

*Primary Examiner* — Richard G Davis
(74) *Attorney, Agent, or Firm* — Foley & Lardner LLP (57) ABSTRACT

A fishing rod assembly includes a rod, a grip assembly, and a vibration magnification member. The rod is configured to receive a vibration at a first end and transfer the vibration downwards through the rod to a second end. The grip is coupled to the rod at the second end and defines a grasping portion for grasping by a user. The vibration magnification member is positioned at the grasping portion along the rod. An interior surface of the vibration magnification member and an exterior surface of the rod cooperatively define a chamber configured to receive the vibration from the rod, increase a magnitude of the vibration, and transfer the vibration with the increased magnitude to the grasping portion to increase a perceptibility of the vibration by the user.

20 Claims, 4 Drawing Sheets

FISHING ROD WITH VIBRATION AMPLIFICATION CHAMBER

CROSS-REFERENCE TO RELATED PATENT APPLICATION

The is application claims the benefit of and priority to U.S. Provisional Patent Application No. 63/505,363, filed May 31, 2023.

BACKGROUND

The present disclosure relates generally to fishing rods. More particularly, the present disclosure relates to a handle for a fishing rod.

SUMMARY

One embodiment relates to a fishing rod assembly. The fishing rod assembly includes a rod, a grip assembly, and a vibration magnification member. The rod is configured to receive a vibration at a first end and transfer the vibration downwards through the rod to a second end. The grip is coupled to the rod at the second end and defines a grasping portion for grasping by a user. The vibration magnification member is positioned at the grasping portion along the rod. An interior surface of the vibration magnification member and an exterior surface of the rod cooperatively define a chamber configured to receive the vibration from the rod, increase a magnitude of the vibration, and transfer the vibration with the increased magnitude to the grasping portion to increase a perceptibility of the vibration by the user. The fishing rod assembly further includes a structural member of the grip assembly configured to indirectly couple the grip assembly to the rod. The fishing rod assembly further including a seat configured to fixedly couple a reel apparatus to the rod. The reel apparatus is a baitcaster reel of a spinning reel. A diameter of the vibration magnification member is configured to decrease as the vibration magnification member extends in a direction towards the second end of the rod. At least a portion of the interior surface of the vibration magnification member and the exterior surface of the rod are in direct contact. The grip assembly includes a rod butt configured to provide a point of contact for the user during an operation of the fishing rod assembly. An interior surface of the rod butt defines a second vibration amplification chamber configured to increase the magnitude of the vibration, and transfer the vibration with the increased magnitude to the grasping portion to increase the perceptibility of the vibration by the user. The grip assembly includes a structural member coupled to the rod, the structural member defining an inner volume configured to facilitate transferring the vibration from the rod to the vibration magnification member. The vibration magnification member includes a first portion having a first inner diameter, a second portion having a variable diameter, and a third portion having a third inner diameter. The first inner diameter is less than the third inner diameter. At least a portion of the third portion of the vibration magnification member directly contacts the grip assembly. The chamber of the vibration magnification member is tuned to a resonant frequency or resonant frequency range that fall within a 5 Hertz to 150 Hertz range.

Another embodiment relates to a fishing rod assembly. The fishing rod assembly includes a rod, a grip assembly, and a vibration magnification member. The rod is configured to receive a vibration and transfer the vibration through the rod. The grip assembly is coupled to the rod and defines a grasping portion for grasping by a user. The vibration magnification member coupled with the rod and the grip assembly. An interior surface of the vibration magnification member and an exterior surface of the rod cooperatively define a chamber configured to receive the vibration from the rod, increase a magnitude of the vibration, and transfer the vibration with the increased magnitude to the grasping portion to increase a perceptibility of the vibration by the user. The fishing rod assembly further includes a structural member of the grip assembly configured to indirectly couple the grip assembly to the rod. The vibration magnification member includes a first portion having a first inner diameter, a second portion having a variable diameter, and a third portion having a third inner diameter. The first inner diameter is less than the third inner diameter such that at least a portion of the third portion of the vibration magnification member directly contacts the grip assembly, and at least a portion of the first portion directly contacts the rod.

Still another embodiment relates to a fishing rod assembly. The fishing rod assembly includes a rod, a grip assembly, and a vibration magnification member. The rod is configured to receive a vibration at a first end and transfer the vibration downwards through the rod to a second end. The grip is coupled to the rod at the second end and defines a grasping portion for grasping by a user. The vibration magnification member is positioned upwards of the grasping portion along the rod. An interior surface of the vibration magnification member and an exterior surface of the rod cooperatively define a chamber configured to receive the vibration from the rod, increase a magnitude of the vibration, and transfer the vibration with the increased magnitude to the grasping portion to increase a perceptibility of the vibration by the user. At least a portion of the interior surface of the vibration magnification member and the exterior surface of the rod directly contact. At least a portion of the interior surface of the vibration magnification member and an exterior surface of the grip assembly directly contact.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, a fishing rod includes a rod (e.g., an elongated member, a tubular member, a hollow member, a tube, etc.), a reel assembly, and a handle assembly. The fishing rod may also include one or more eyelets or guide members disposed in an array along the rod and configured to guide a fishing line from the reel assembly to an end of the rod. The handle assembly is coupled with the rod such that the handle assembly is in contact with the rod directly, indirectly, or directly along some portions and indirectly along others. More generally, the handle assembly may be fixedly coupled with the rod such that vibrations from the rod (e.g., while wrangling a fish at an end of the fishing line) can be transferred to a portion of the handle assembly. In particular, an interior surface of an echo chamber member of the handle assembly and an exterior surface of the rod can cooperatively define a vibration amplification chamber. During operation of the fishing rod (e.g., while a user is operating the reel assembly to take up the fishing line onto a spool of the reel assembly, or wrangling a fish at the end of the fishing line), the rod may receive a vibration (e.g., an impulse, a force, etc.) at an end of the rod while a fish or aquatic game is hooked on the end of the fishing line. The vibration may propagate through the rod, and into the vibration amplification chamber (e.g., through one or more structural members of the handle assembly such as the echo chamber member). The vibration amplification chamber of the handle assembly is configured to magnify or increase a magnitude of the vibration and transfer a magnified or increased vibration to the user through the handle assembly to thereby increase tactile or haptic perceptibility of the vibration. Increasing the tactile or haptic perceptibility of vibrations that are transferred through the rod to the user's hand can improve the user's ability to discern if a fish or aquatic game has tugged on the end of the fishing line.

Vibration Chamber

Referring particularly to FIGS. 1-4 a fishing rod assembly 10 (e.g., a fishing reel, a baitcasting reel, a spinning reel, a fishing rod, a fishing reel assembly, etc.) includes a rod 14 (e.g., a pole, an elongated member, a flexible member, a tubular member, a hollow member, etc.), a reel mechanism 24 (e.g., a reel apparatus, a reel assembly, a fishing line retrieval apparatus, a spinning reel, a baitcaster, a reel etc.), and a grip assembly 18. The grip assembly 18 can include or define a grasping portion for at least one hand for a user to grasp while using the fishing rod assembly 10 (e.g., while casting, performing reeling operations, wrangling a fish, etc.), shown as grasping portion 26 (e.g., a surface, one or more finger holds, geometry configured to conform to an operator's hand or fingers), and grasping portion 28. The reel mechanism 24 is fixedly coupled, attached, mounted, etc., on the rod 14 at seat 22 (e.g., an interlocking portion, a receiving portion, a structural portion defining one or more openings for fasteners to fasten the reel mechanism 24 on the rod 14, a mount, an attachment member, an attachment portion, etc.). The seat 22 may be fixedly coupled radially about the rod 14. In some embodiments, the reel mechanism 24 is removably coupled with the rod 14. The grip assembly 18 is fixedly coupled, attached, mounted, etc., with the rod 14 such that the grip assembly 18 directly contacts, abuts, or engages the rod 14 at one or more locations, and/or indirectly contacts the rod 14 at one or more locations. The rod 14 may be a casting rod, spinning rod, fly fishing rod, or any other elongated flexible member.

The seat 22 may be fixedly coupled radially about the rod 14 proximate the grasping portion 26. The seat 22 is configured to fixedly couple the reel mechanism 24 to the rod 14. The seat 22 includes multiple cutouts and protrusions that facilitate coupling the reel apparatus to the rod 14. Further, the cutouts and protrusions may provide an ergonomic shape for the user to place their fingers while holding the fishing rod assembly 10.

In some embodiments, the reel mechanism 24 is a baitcaster reel as described in U.S. application Ser. No. 17/946,679, filed Sep. 16, 2022, the entire disclosure of which is incorporated by reference herein. In some embodiments, the reel mechanism 24 is the same as or similar to the reel assembly as described in U.S. application Ser. No. 17/473,873, filed Sep. 13, 2021, the entire disclosure of which is incorporated by reference herein. In some embodiments, the reel mechanism 24 is a spinning mechanism similar to the as described in U.S. application Ser. No. 16/906,806, filed Jun. 19, 2020, now U.S. Pat. No. 11,350,617, the entire disclosure of which is incorporated by reference herein. The reel mechanism 24 is generally configured to let out or take up a fishing line for performing one or more fishing or wrangling operations. In some embodiments, the reel apparatus is a spinning reel, spincast reel, etc., or any other fishing line retrieval apparatus.

Figure 1:
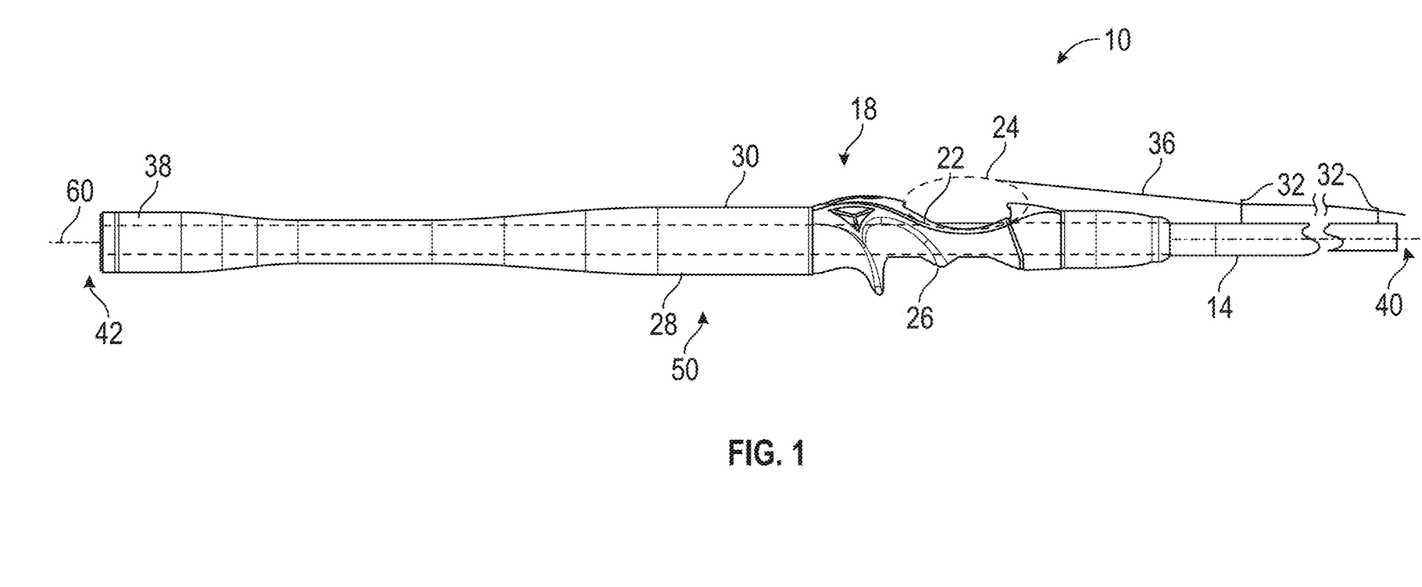
FIG. 1 is a side view of a portion of a fishing rod assembly, according to some embodiments.

Referring particularly to FIG. 1, the rod 14 includes one or more eyelets 32 disposed along the rod 14. The eyelets 32 receive a fishing line 36 and guide the fishing line 36 from a distal end 40 (e.g., a first end, a tip end, a free end, an outer end relative to the user, etc.) of the rod 14 in a direction towards a proximate end 42 (e.g., a second end, a rear end, a butt end, an inner end relative to the user, etc.) to the reel mechanism 24. The reel mechanism 24 can operate to take up or let out the fishing line 36, and the eyelets 32 guide the fishing line 36 from the reel mechanism 24 to the distal end 40. The grip assembly 18 is positioned along the rod 14 at the proximate end 42. The rod 14 also defines an axis 60 that extends longitudinally through the rod 14 and defines a longitudinal direction of the fishing rod assembly 10. In particular, travel "down" the rod 14 indicates travel from the distal end 40 to the proximate end 42, whereas travel "up" the rod 14 indicates travel from the proximate end 42 to the distal end 40. In some embodiments, the grip assembly 18 extends from a position upwards of the proximate end 42 to the proximate end 42.

The grip assembly 18 is configured to be installed radially about the rod 14. The grip assembly 18 may be fixedly coupled on the rod 14. In some embodiments, the grip assembly 18 is removably coupled with the rod 14. The grip assembly 18 is positioned about the rod 14 at or near the proximate end 42 of the rod 14. The grip assembly 18 may extend, at least partially, about the seat 22 and couple to the seat 22, such that the grip assembly 18 is indirectly coupled to the rod 14. In some embodiments, the grip assembly 18 is directly coupled to the rod 14 (e.g., an interior surface of the grip assembly 18 directly engages with an exterior surface of the rod 14).

The grip assembly 18 may have the form of or include a hollow radial shell including a wall 30. As the wall 30 of the grip assembly 18 extends in the direction towards the proximate end 42 of the fishing rod assembly 10, a radius of the grip assembly 18 tapers down (e.g., the radius of the grip assembly 18 decreases), such that at least a portion of an interior radial surface of the grip assembly 18 directly contacts the exterior radial surface of the rod 14. The grip assembly 18 may extend beyond a length of the rod 14 to a portion of the grip assembly 18 with a larger radius, shown as rod butt 38. The rod butt 38 provides a point of contact for a user operating the fishing rod assembly 10 (e.g., casting, reeling, striking) to stabilize and/or otherwise grasp the fishing rod assembly 10. In some embodiments, the grip assembly 18 does not include the rod butt 38.

Figure 2:
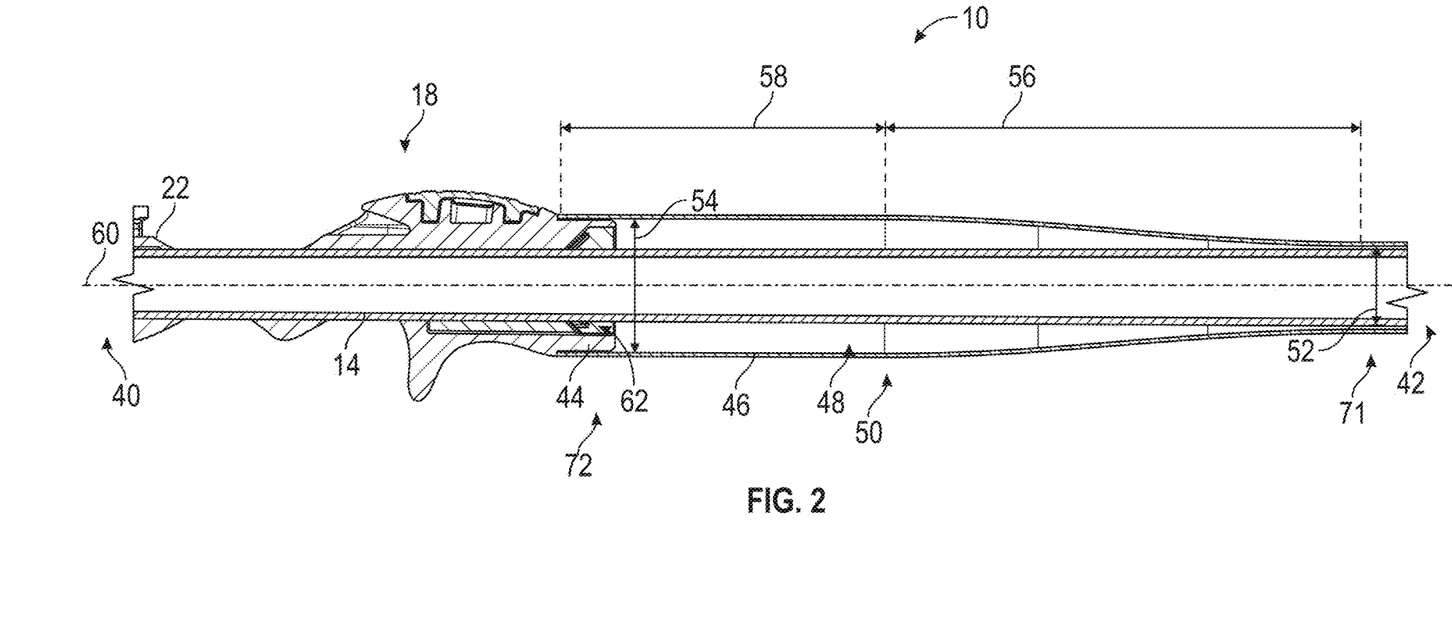
FIG. 2 is a side sectional view of a portion of the fishing rod assembly of FIG. 1, according to some embodiments.
Figure 3:
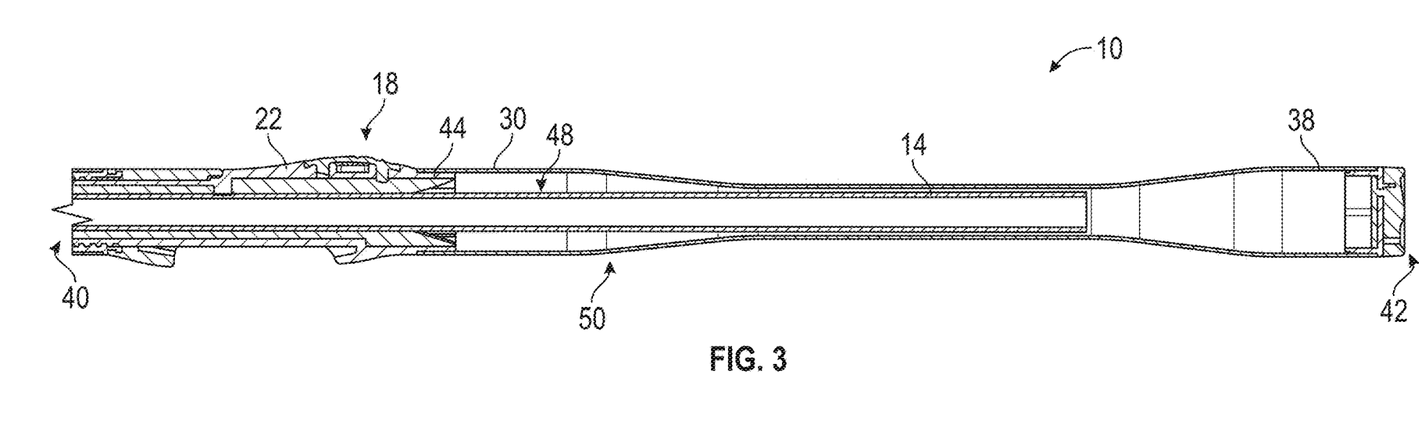
FIG. 3 is a side sectional view the fishing rod assembly of FIG. 1, according to some embodiments.
Figure 4:
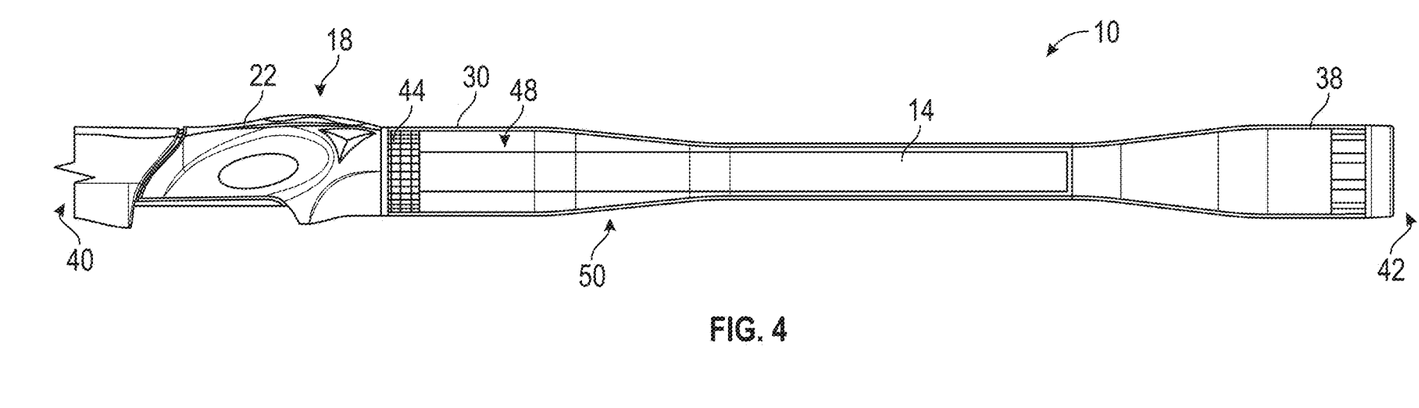
FIG. 4 is a side view of the fishing rod assembly of FIG. 1, according to some embodiments.

Referring particularly to FIG. 2, the fishing rod assembly 10 includes a vibration magnification member 50 (e.g., a vibration propagation member, a vibration amplification member, a sensitivity member, a vibration transference member, etc.). The vibration magnification member 50 includes a body 46 having the form of a shell, a sleeve, a frustoconical sidewall, a longitudinally extending wall, a surface, a wall, a sidewall, etc., that extends longitudinally along the rod 14 and is coupled with the rod 14. A radially outer surface of the rod 14 and an inner surface of the body 46 define an inner volume, shown as vibration amplification chamber 48. The vibration magnification member 50 is fixedly coupled with a structural member 44 (e.g., a body, a ring, an interlocking member, an end of the grip assembly 18, etc.) of the grip assembly 18 that is fixedly coupled with the rod 14 and directly contacts the radially outer surface of the rod 14. The vibration magnification member 50 is configured to fixedly couple with the structural member 44 and directly contact the structural member 44. The structural member 44 thereby fixedly couples the body 46 with the rod 14 at an end of the vibration magnification member 50 proximate the seat 22. In some embodiments, an opposite end of the body 46 (e.g., an end of the body 46 that is opposite the end at which the body 46 contacts the structural member 44) contacts (e.g., directly or indirectly through one or more other coupling members) the rod 14. In some embodiments, the vibration magnification member 50 is a component of the grip assembly 18 and is installed on an end of the grip assembly 18 where the rod 14 extends out of the grip assembly 18 (e.g., on an end of the grip assembly 18 more proximate the proximate end 42). The vibration magnification member 50 is configured to receive vibrations from further down the rod 14 (e.g., from the distal end 40) at a first end 71 (e.g., where the body 46 contacts the rod 14 through the structural member 44), magnify the vibration, and transfer the vibration to the grip assembly 18 at a second end 72 (e.g., where the user grasps the fishing rod assembly 10).

Referring still to FIG. 2, the body 46 extends longitudinally along the rod 14 and includes a first portion having a first inner diameter 52, a second portion having a variable or changing inner diameter, and a third portion having a third inner diameter, shown as inner diameter 54. The inner diameter of the body 46 increases from the first portion to the third portion. The first inner diameter 52 may be substantially equal to an outer diameter of the rod 14. The inner diameter 54 may be substantially equal to an outer diameter of the structural member 44 such that the body 46 extends over the structural member 44 (e.g., the third portion directly contacts the grip assembly 18). The body 46 may be press fit, interlocked, adhered, fastened, etc., on the structural member 44. The structural member 44 may define an inner volume 62 having a frustoconical shape through which the rod 14 extends. The inner volume 62 of the structural member 44 may facilitate transferring vibrations or impulses that travel down the rod 14 from the distal end 40 to the structural member 44 into the body 46 and into the vibration amplification chamber 48 (thereby indirectly coupling the grip assembly 18 to the rod 14).

Referring still to FIG. 2, the inner diameter of the body 46 may increase with respect to upwards travel along the rod 14 (e.g., towards the proximate end 42). In particular, the inner diameter of the body 46 increases from the first inner diameter 52, which is substantially equal to the outer diameter of the rod 14, to the inner diameter 54 which is substantially equal to the outer diameter of the structural member 44 (e.g., a second inner diameter). The inner diameter 54 of the body 46 increases along the second portion of the body 46 (e.g., with respect to moving upwards along the rod 14 towards the distal end 40) which is defined along a distance 56. The first portion of the body 46 may be defined as portions of the body 46 that are disposed further down along the rod 14 towards the proximate end 42, past the beginning of the second portion of the body 46. In some embodiments, the inner diameter of the body 46 increases linearly along the distance 56 from the first inner diameter 52 to the inner diameter 54. In some embodiments, the inner diameter of the body 46 increases non-linearly (e.g., according to a curvilinear function) along the distance 56. In some embodiments, the inner diameter of the body 46 increases at different linear rates along different portions of the distance 56. For example, across a first portion of the distance 56, the inner diameter of the body 46 may increase according to a first linear rate or slope (or according to a curvilinear function), across a second portion of the distance 56 the inner diameter of the body 46 may increase according to a second linear rate or slope that is greater than the first linear rate or slope, and across a third portion of the distance 56 the inner diameter of the body 46 may increase according to a third linear rate or slope that is less than the second linear rate or slope. It should be understood that the inner diameter of the body 46 may increase according to any linear or non-linear function, or combination thereof along different portions, of the distance 56 in the upwards direction along the rod 14 (e.g., in the direction along the axis 60 from the proximate end 42 to the distal end 40).

The body 46 may have a substantially constant value of the inner diameter, shown as inner diameter 54, along the third portion defined by the distance 58. As shown in FIG. 2, the inner diameter of the body 46 is substantially constant from a transition between the second portion and the third portion to the structural member 44 (e.g., across the distance 58). The body 46 may similarly have a constant value of the inner diameter along the first portion, substantially equal to the outer diameter of the rod 14.

During operation of the fishing rod assembly 10 (e.g., while casting, performing reeling operations, wrangling a fish, etc.) the user grasps the fishing rod assembly 10 with a hand or with fingers positioned to at least partially contact the grip assembly 18 and the vibration magnification member 50. Further, during operation, the rod 14 may receive a vibration (e.g., an impulse, a force, etc.) at the distal end 40 and vibrate in response to a fish or other aquatic game being hooked by an end of the fishing line 36 of the fishing rod assembly 10. The vibration may propagate through the rod 14 (e.g., from the distal end 40 down the rod 14 towards the proximate end 42), which indicates to the user that a fish or other aquatic game has been hooked by the fishing rod assembly 10. The vibration through the rod 14 is transmitted to the grip assembly 18 that couples the rod 14 to the vibration magnification member 50. Further, the vibration through the rod 14 may be transmitted to the vibration magnification member 50 through a portion of the body 46 that directly contacts the radially outer surface of the rod 14 (e.g., at an end of the second portion of the vibration magnification member 50 or along the third portion). The vibration amplification chamber 48 is configured to receive the vibration directly and/or indirectly from the rod 14 and increase the magnitude (e.g., amplitude, frequency, etc.) of the vibration. The vibration amplification chamber 48 may then transmit the magnified or increased vibration to the user's hand or fingers to thereby increase tactile or haptic perceptibility of the vibration. The vibration amplification chamber 48 may change (e.g., increase, magnify, etc.) the amplitude and/or the frequency of the vibration transmitted from the rod 14 to the vibration magnification member 50. Changing the amplitude and/or the frequency of the vibration may increase the intensity of the vibrations felt by the user and/or increase the sensitivity of the transmissibility of the vibration in order to inform the user of the vibration received by the rod 14. Generally, a human is capable of perceiving a vibration with a frequency between a range of 5 Hertz to 150 Hertz. In some embodiments, the vibration amplification chamber 48 may be tuned to one or more resonant frequencies and/or resonant frequency ranges that fall within the 5 Hertz to 150 Hertz range. In such embodiments, the vibration amplification chamber 48 may further increase or magnify the vibration if the vibration has a frequency that matches the one or more resonant frequencies and/or resonant frequency ranges of the vibration amplification chamber 48. In some embodiments, an interior surface of a wall of the rod butt 38 may define a second vibration amplification chamber that operates substantially similarly to the vibration amplification chamber 48 to increase the vibrational response, tactile perceptibility, etc., of the vibrations transmitted from the rod 14 to the vibration magnification member 50.

Sensitivity Testing

Figure 5:
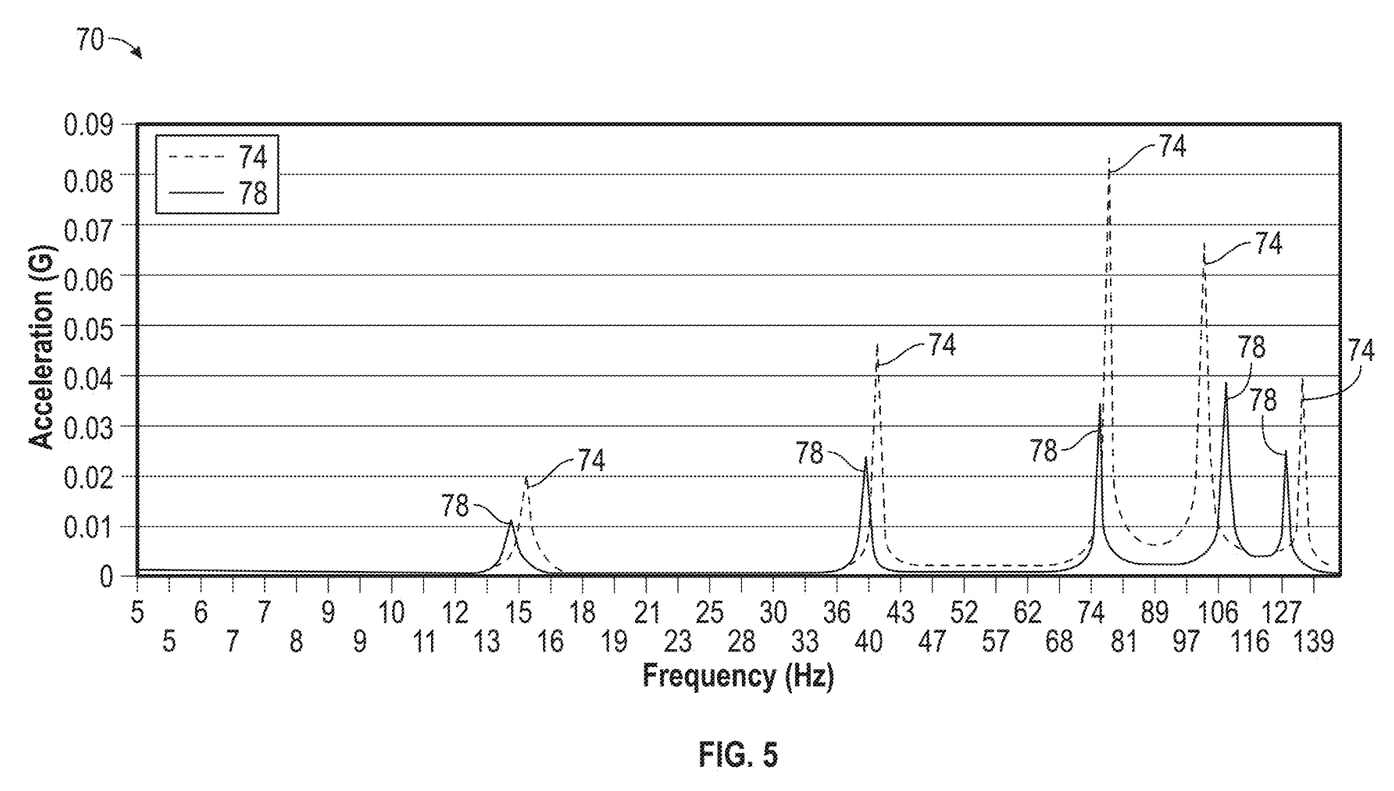
FIG. 5 is a graph of test results comparing vibration transmissibility of the fishing rod assembly of FIG. 1 to a fishing rod assembly not including a vibration amplification chamber.

Referring to FIG. 5, a graph 70 illustrates test results of the fishing rod assembly 10 versus other fishing rods. The tests are performed in order to test the vibration transmissibility of the vibration amplification chamber 48. To test the vibration transmissibility, the rod 14 was mounted proximate the proximate end 42 to a rigid test structure and received a vibrational input from an electrodynamic shaker at the distal end 40 of the fishing rod assembly 10. The rod 14 received a 0.2 g acceleration sinusoidal sweep at 1 octave/minute from a frequency range of 5 Hertz to 150 Hertz. The test covered the frequency range of 5 Hertz to 150 Hertz because, generally, that is the frequency range of Hertz ("Hz") that is perceptible to a human. The same test was also conducted on five different fishing rods to measure a difference of the vibration transmissibility with and without the vibration amplification chamber 48. Each of the five different fishing rods tested did not include the vibration amplification chamber 48.

The test produced an acceleration versus frequency response plot that could be used to directly compare the sensitivity (e.g., the vibration transmissibility) of each fishing reel that was tested. The fishing rod assembly 10 with the vibration amplification chamber 48 and each of the five different fishing rods that were tested generally output sensitivity readings across five different Hertz ranges: 1) 13 Hz-16 Hz; 2) 36 Hz-43 Hz; 3) 73 Hz-81 Hz; 4) 96 Hz-111 Hz; and 5) 125 Hz-140 Hz. Referring to FIG. 5, the graph 70 illustrates the test results of a series of data where the fishing rod assembly 10 included the vibration amplification chamber 48, shown as first series 74. The graph 70 overlays the first series 74 with a series of data where a fishing rod of the five different fishing rods did not include the vibration amplification chamber 48, shown as second series 78. Across each of the five different Hertz ranges, the first series 74 produces sensitivity readings that are greater than the output sensitivity readings of the second series 78. Further, across each of the five different Hertz ranges, the fishing rod assembly 10 with the vibration amplification chamber 48 produces sensitivity readings that are greater than the output sensitivity readings of all five different fishing rods. The test results show that with the vibration amplification chamber 48, the vibration transmissibility from the rod 14, through the vibration amplification chamber 48, and to the hand of the user is, on average, twice as sensitive (e.g., the acceleration transmitted to the user's hand is twice as great) as rods that do not include the vibration amplification chamber 48.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim. It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A fishing rod assembly comprising:
a rod configured to receive a vibration at a first end and transfer the vibration downwards through the rod to a second end;
a grip assembly coupled to the rod at the second end and defining a grasping portion for grasping by a user; and
a vibration magnification member positioned at the grasping portion along the rod, an interior surface of the vibration magnification member and an exterior surface of the rod cooperatively defining a chamber, the chamber configured to receive the vibration from the rod, increase a magnitude of the vibration, and transfer the vibration with the increased magnitude to the grasping portion to increase a perceptibility of the vibration by the user.

2. The fishing rod assembly of claim 1, further comprising a structural member of the grip assembly, the structural member configured to indirectly couple the grip assembly to the rod.

3. The fishing rod assembly of claim 1, further comprising a seat configured to fixedly couple a reel apparatus to the rod.

4. The fishing rod assembly of claim 3, wherein the reel apparatus is a baitcaster reel.

5. The fishing rod assembly of claim 3, wherein the reel apparatus is a spinning reel.

6. The fishing rod assembly of claim 1, wherein a diameter of the vibration magnification member is configured to decrease as the vibration magnification member extends in a direction towards the second end of the rod.

7. The fishing rod assembly of claim 1, wherein at least a portion of the interior surface of the vibration magnification member and the exterior surface of the rod directly contact.

8. The fishing rod assembly of claim 1, wherein the grip assembly includes a rod butt, the rod butt configured to provide a point of contact for the user during an operation of the fishing rod assembly.

9. The fishing rod assembly of claim 8, wherein an interior surface of the rod butt defines a second vibration amplification chamber configured to increase the magnitude of the vibration, and transfer the vibration with the increased magnitude to the grasping portion to increase the perceptibility of the vibration by the user.

10. The fishing rod assembly of claim 1, wherein the chamber of the vibration magnification member is configured to increase the magnitude of the vibration across a frequency range that is perceptible to the user.

11. The fishing rod assembly of claim 1, wherein the grip assembly includes a structural member coupled to the rod, the structural member defining an inner volume configured to facilitate transferring the vibration from the rod to the vibration magnification member.

12. The fishing rod assembly of claim 1, wherein the vibration magnification member includes a first portion having a first inner diameter, a second portion having a variable diameter, and a third portion having a third inner diameter.

13. The fishing rod assembly of claim 12, wherein the first inner diameter is less than the third inner diameter.

14. The fishing rod assembly of claim 13, wherein at least a portion of the third portion of the vibration magnification member directly contacts the grip assembly.

15. The fishing rod assembly of claim 1, wherein the chamber of the vibration magnification member is tuned to a resonant frequency or resonant frequency range that fall within a 5 Hertz to 150 Hertz range.

16. A fishing rod assembly comprising:
a rod configured to receive a vibration and transfer the vibration through the rod;
a grip assembly coupled to the rod and defining a grasping portion for grasping by a user; and
a vibration magnification member coupled with the rod and the grip assembly,
wherein an interior surface of the vibration magnification member and an exterior surface of the rod cooperatively define a chamber configured to:
receive the vibration from the rod;
increase a magnitude of the vibration; and
transfer the vibration with the increased magnitude to the grasping portion to increase a perceptibility of the vibration by the user.

17. The fishing rod assembly of claim 16, further comprising a structural member of the grip assembly, the structural member configured to indirectly couple the grip assembly to the rod.

18. The fishing rod assembly of claim 16, wherein the vibration magnification member includes a first portion having a first inner diameter, a second portion having a variable diameter, and a third portion having a third inner diameter.

19. The fishing rod assembly of claim 18, wherein the first inner diameter is less than the third inner diameter such that at least a portion of the third portion of the vibration magnification member directly contacts the grip assembly, and at least a portion of the first portion directly contacts the rod.

20. A fishing rod assembly comprising:
a rod configured to receive a vibration at a first end and transfer the vibration downwards through the rod to a second end;
a grip assembly coupled to the rod at the second end and defining a grasping portion for grasping by a user, the grip assembly including a structural member configured to indirectly couple the grip assembly to the rod; and
a vibration magnification member positioned upwards of the grasping portion along the rod, an interior surface of the vibration magnification member and an exterior surface of the rod cooperatively defining a chamber, the chamber configured to receive the vibration from the rod, increase a magnitude of the vibration, and transfer the vibration with the increased magnitude to the grasping portion to increase a perceptibility of the vibration by the user,
wherein at least a portion of the interior surface of the vibration magnification member and the exterior surface of the rod directly contact, and
wherein at least a portion of the interior surface of the vibration magnification member and an exterior surface of the grip assembly directly contact.

* * * * *